United States Patent Office 3,309,868
Patented Mar. 21, 1967

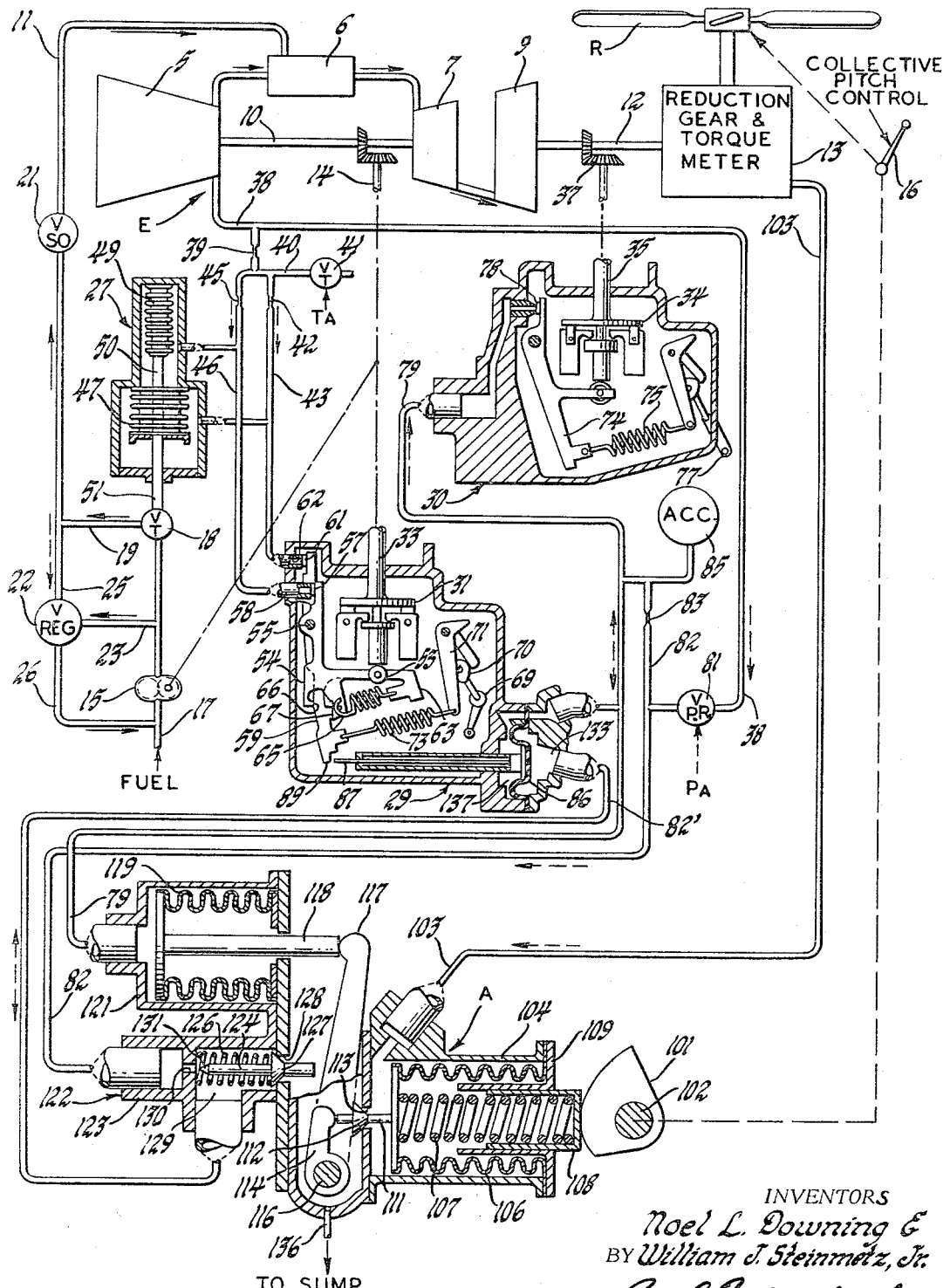

3,309,868
ENGINE CONTROL WITH ANTICIPATOR
Noel L. Downing and William J. Steinmetz, Jr., Indianapolis, Ind., assignors to General Motors Corporation, Detroit, Mich., a corporation of Delaware
Filed Aug. 11, 1965, Ser. No. 478,818
7 Claims. (Cl. 60—39.16)

Our invention relates to controls for power plants and is particularly suited to the requirements of a gas turbine power plant coupled to a variable load. Specifically, the preferred embodiment of the invention lies in improvements in power controls for gas turbine engine driving a lifting rotor for a helicopter. The purpose of our invention is to improve the responsiveness of gas turbines driving variable loads and more specifically to increase the maneuverability and safety of gas turbine powered helicopters.

With respect to the background of our invention, it has been known to drive a lifting rotor of a helicopter from a gas turbine engine of the gas-coupled type through a reduction gear. A known control for such power plants limits the fuel to the engine upon acceleration in response primarily to compressor discharge pressure. The known control also includes a govenor responsive to gas generator speed of the engine which operates to reduce fuel when the gas generator reaches a preset speed. The prior control also includes a power turbine governor responding to speed of the power output turbine and therefore of the lifting rotor unless the lifting rotor is overrunning the turbine. This power turbine governor modifies the operation of the fuel controlling means of the gas generator governor so that fuel is reduced in response to overspeed of the power turbine. Power turbine speed setting may be varied.

Under certain circumstances it is desirable for maneuvering a helicopter to reduce both the engine power output and the collective pitch of the rotor temporarily. As a result, the rotor will overspeed and the gas generator will go to idle speed. When the pilot then increases collective pitch to sustain the aircraft, the governoring mechanism responds to the resulting underspeed of the power turbine to increase fuel so as to handle the suddenly increased load. However, due to the acceleration lag of a turbine type gas generator, the engine is slow in developing the gas horsepower required to enable the power output turbine to drive the lifting rotor at the increased pitch setting.

Our invention as applied to such an installation involves means which responds to the power output of the engine and also to the aircraft pilot's action increasing collective pitch to modify the action of the governor and feed additional fuel to the gas generator without waiting for an underspeed signal from the power turbine. Thus, our invention involves an anticipating type of control which causes an immediate response of the engine to a need for more power rather than a response to the deceleration of the load caused by the absence of needed power.

The nature of the invention and the advantages thereof will be apparent to those skilled in the art from the succeeding detailed description of the preferred embodiment of the invention and the accompanying drawing thereof.

The figure is a schematic diagram of the basic elements of a fuel supply and control system associated with a gas turbine helicopter power plant of the gas-coupled or free turbine type.

Referring first to the figure, a gas turbine engine E, illustrated schematically, includes a compressor 5, combustion apparatus 6, a gas generator turbine 7, and a power turbine 9. The gas generator turbine drives the compressor through a shaft 10 and the compressor supplies air to the combustion apparatus. Fuel supplied through a line 11 is burned in the combustion apparatus and the resulting combustion products flow first through the gas generator turbine 7 and then through the power turbine 9, from which they are exhausted to atmosphere. The power turbine is coupled by suitable transmission means indicated by a shaft 12 and a reduction gear and torquemeter assembly 13 to the lifting rotor R of an aircraft. Controls for rotor R include a pilot-operable collective pitch control lever 16.

The gas generator turbine 7 is geared to an accessory drive shaft 14 which is coupled to a fuel pump 15. This pump is supplied with fuel through a line 17 and delivers the fuel through a fuel metering valve 18 of the throttling type into line 19 which is connected through a shutoff valve 21 to the engine fuel inlet line 11. A regulating valve 22 maintains a constant pressure drop across the metering valve 18. The regulating valve is connected to the pump outlet by a line 23 and to the fuel line 19 by a branch line 25. The valve opens to return fuel through a bypass line 26 to the pump inlet so as to maintain a predetermined pressure drop across metering valve 18. The shutoff valve 21 is provided to close the fuel line when the engine is shut down. A pump pressure relief valve (not illustrated) is ordinarily provided also.

The metering valve 18 is operated by a pneumatic actuator 27 which operates primarily in response to compressor discharge pressure of the engine to meter or limit fuel during acceleration of the engine. The actuator 27 also is controlled directly or indirectly by a gas generator control 29 and a power turbine governor 30. The gas generator control responds to the speed of turbine 7 by means of a flyweight device 31 on a shaft 33 coupled to shaft 14 driven by the gas generator. The power turbine governor includes a flyweight speed responsive device 34 on a shaft 35 coupled through gearing 37 to the power turbine shaft 12 and thus also to the lifting rotor R.

As will be described, the gas generator control 29 acts as a governor to hold the gas generator at the preset speed and also includes means for enriching fuel during acceleration above a predetermined speed. The power turbine governor 30 acts to transmit a force to the gas generator control to modify its action and reduce fuel if the power turbine increases above a preset limit. These controls act by bleeding down or, in other words, modulating the pressures derived from the compressor of the gas turbine and fed to the actuator 27 to control the fuel metering valve 18.

Explaining this more fully, an input to the fuel control of compressor discharge pressure is obtained through a line 38. Line 38 is connected through an orifice 39 to a manifold 40. A throttling valve 41 which connects manifold 40 to an atmospheric vent is coupled to means responsive to ambient atmospheric temperature. Valve 41, coacting with orifice 39, serves to modify compressor discharge pressure in manifold 40 in response to ambient temperature and thereby modify fuel flow in response to ambient temperature. Manifold 40 is connected through an orifice 42 to a governing pressure line 43 and through an orifice 45 to a fuel enrichment pressure line 46. These lines are connected to the actuator 27 and to the gas generator control 29.

The actuator 27 comprises two coaxial bellows 47 and 49. Bellows 47 is of larger area than bellows 49, which is evacuated. Line 46 is connected to the space between the bellows and line 43 connects to the outside of bellows 47. These two bellows are connected to each other by a rod or stem 50 and to the metering valve 18 by a suitable linkage indicated by a continuation 51 of reciprocable rod 50. The arrangement is such that contraction of the bellows increases fuel flow. The valve is biased to reduce fuel by a spring force which may be from the inherent resiliency of the bellows 47 and 49. Thus, when the pressures in lines 43 and 46 increase concurrently with an increase in compressor discharge pressure this acts upon the difference of area of the two bellows to increase fuel flow. Speed is limited by bleeding air from line 43 by the gas generator control to be described, thus reducing fuel. Reduction in the fuel enrichment pressure in line 46 supplied to the actuator between the two bellows acting upon the difference of areas of the two bellows will increase fuel. In the operation of the system, this reduction in the enrichment pressure is also accompanied by the gas generator control.

Proceeding to the gas generator control 29, the flyball speed responsive device 31 acts against a roller 53 on a fuel enrichment lever 54 pivoted on a fulcrum 55. The opposite end of lever 54 mounts a half-ball valve member 57 which normally closes against a seat 58 connected to enrichment pressure line 46. A governor lever 59, also pivoted on the fulcrum 55, mounts a half-ball valve member 61 which may close the seat 62 at the end of governing pressure line 43. The enrichment lever 54 is coupled to an extension 63 of the governor lever by a light coil spring 65. When the engine is at rest or is operating below a predetermined speed this spring maintains an abutment 66 on the enrichment lever in contact with the governor lever. When the speed reaches the predetermined value, the flyball device rocks the enrichment lever until a second abutment 67 thereon is brought against the governor lever, this being accompanied by a slight extension of spring 65. This rocking motion of the enrichment lever opens the valve 57 and bleeds air from the line 46.

The governor lever 59 opens the valve 61 at a higher value speed which could be fixed value but, as illustrated, may be variably set by an operator-controllable gas generator control lever 69 which through a cam 70 rotates a bellcrank 71. A speeder spring 73 is connected between the bellcrank 71 and the governor lever 59. At some speed of the gas generator, depending upon the governor setting, the flyball device opens valve 61 to bleed line 46 and thus reduces fuel flow.

Proceeding now to the power turbine governor, this embodies a governor essentially the same as that just described in the gas generator control except that the enrichment lever is absent and the flyball device 34 works directly on a governor lever 74. Lever 74 is biased by a spring 75 variably set by power turbine speed control 77. Lever 74 controls a half-ball valve 78 which, upon overspeed of the power turbine, opens to bleed air from a line 79. Reduction of pressure in line 79 is effective to modify the action of the gas generator governor. Compressor discharge pressure line 38 is connected through a pressure regulating valve 81 to a reference pressure line 82. Regulating valve 81 responds to ambient pressure and to the pressure in line 82 to hold the reference pressure at a fixed level above atmospheric pressure. Line 82 is connected through an orifice 83 to power turbine overspeed line 79. Opening of valve 78 upon power turbine overspeed reduces the governing pressure in line 79 because of the drop through orifices 83. An accumulator 85 connected to line 79 slows the rate of change in pressure in line 79 in response to overspeed. Lines 79 and 82 are connected to opposite sides of a diaphragm 86 in the gas generator control 29. In the prior art fuel control lacking our improvement, lines 79 and 82 both connect directly to diaphragm 86. According to our invention, line 82 is connected through an anticipator A and line 82' to control 29. Diaphragm 86 is connected to a push rod 87 which may engage the end 89 of the governor lever 59. The pressures in lines 79 and 82' will normally be aqual as long as valve 78 is closed (assuming that conditions are such that anticipator A is ineffective). However, when valve 78 opens and reduces the governing pressure in line 79 the resulting pressure differential acts upon diaphragm 86 to exert a force on the governor arm 59 tending to open valve 61 and thus reduce fuel.

To summarize, the prior art fuel control embodies pressure responsive means 27 for regulating engine fuel which basically responds to compressor discharge pressure. The speed of the engine is limited and held at the desired value by bleeding pressure either directly through action of the gas generator control or indirectly through action of the power turbine governor on the gas generator control. Thus, in effect, the power turbine governor 30 acts to modify fuel flow so as to cause the power turbine to turn at the speed set by the control lever 77. If the rotor is overspeed, the bleed-off of governing pressure from line 79 causes diaphragm 86 to open valve 61 and thus cause valve 18 to reduce fuel. On the other hand, if the power turbine is underspeed, the valve 78 is throttled and the pressure exerted by diaphragm 86 tending to open valve 61 decreases, causing an increase in engine fuel.

Thus, if the pilot in conducting a maneuver reduces the collective pitch by his control 16, this takes the load off the power turbine and it tends to overspeed. Thereupon the power turbine governor acts to reduce fuel to hold the power turbine on speed and the result is that the gas generator is brought to near idle condition. If the rotor pitch is then increased, the rotor decelerates and slows down the power turbine with the result that valve 61 is actuated to increase engine fuel; but adequate power to maintain the desired rotor speed is not available until the gas generator is accelerated.

The anticipator A which is added to the prior system by our invention receives a signal at the time the collective pitch is increased and modifies the control signals acting on diaphragm 86 to increase fuel prior to any load-induced deceleration of the power turbine. Thus, the fuel increase does not depend upon deceleration of the lifting rotor, which acts more or less as a flywheel, but responds directly to the signal from the pilot.

The anticipator A includes a cam 101 rotated by shaft 102 coupled to the collective pitch control lever 16 by means indicated schematically by a dotted line. Thus it responds to the collective pitch. The reduction gear and torquemeter assembly 13 includes a torquemeter (not illustrated) which transmits an oil pressure proportional to torque of the engine. Since torquemeters of this type are known, there is no need to describe the mechanism. The torque pressure is transmitted through a tube 103 to the anticipator A specifically to the interior of a cylinder 104 within which is mounted a bellows 106. The torquemeter pressure acts to collapse the bellows and the bellows is biased to extend by a compression spring 107. Spring 107 abuts a tappet 108 guided in the head 109 of cylinder 104 and in engagement with cam 101. A stem 111 extending from the head of bellows 106 bears a valve plug 112 which normally closes an opening 113 in the head of cylinder 104. Stem 111 also bears against an arm 114 fixed on a rotatably mounted shaft 116. Shaft 116 bears a second arm 117, the end of which engages a push rod 118 extending from the head of a bellows 119. This bellows is mounted in a cylinder 121 which receives one branch of governing pressure line 79. Arm 117 also actuates a valve 122 which comprises a body 123. A movable valve member 124 within the body is biased by compression spring 126 so that a head 127 on the valve member normally closes an outlet 128 to ambient atmospheric pressure. The chamber 129 within the body within which spring 126 is mounted is connected to a line 82' which leads to the space 133 outside diaphragm 86 in gas generator control 29. The reference pressure line 82 also connects to the body 123. A port 130 normally allows free communication between reference pressure line 82 and line 82' leading to the control 29, and valve head 127 normally closes chamber 129 against exhaust to atmosphere. However, if arm 117 is moved counterclockwise as illustrated, it opens the valve 127, 128 and the valve head 131 on member 124 closes the port 130. Thus, the reference pressure space 133 to the right of diaphragm 86 is normally subject to reference pressure from line 82 but, when the valve member 124 is moved to the left, it is connected instead to atmosphere. Thus the anticipator provides means to reduce the pressure in line 82′ below the normal level.

The operation of the anticipator may now be described. The parts are shown in the figure as they might appear during normal operation, with valve plugs 112 and 127 seating and valve plug 131 open. If we assume the collective pitch is reduced, cam 101 reduces the compression of spring 107. The reduced load on the engine causes the governing devices to reduce fuel and the torque delivered by the power turbine decreases to a low value. As a result, the torque pressure transmitted by line 103 biasing bellows 106 is decreased. However, as long as the pitch is held at the low value, spring 107 will not open valve 112. The device is calibrated so that when the power output is below some desired value such as approximately five to ten percent of rated engine power, and the lever 16 is moved to call for sixty percent or more of full rotor pitch, the resulting compression of spring 107 by the cam provides sufficient force to override the governor pressure in cylinder 104. In this case, stem 111 moves to the left, rocking arms 114 and 117. In so doing it vents the interior of cylinder 104 into a drain 136 to the sump in the reduction gear so that subsequent increase in torque due to the acceleration of the gas generator will not override the action just described.

Thus, when the engine is at low power and high rotor pitch is called for, arm 117 moves the valve stem 124, opening the chamber 129, line 82′, and chamber 133 to atmospheric pressure through port 128 and closing the port 130 to regulated pressure. The consequent reduction in pressure in chamber 133 removes the bias resulting from overspeed of the unloaded power turbine previously tending to hold fuel flow down. Therefore, the supply of fuel to the engine is increased. Thus, in effect, the control generates a spurious underspeed signal to the gas generator control. Reducing the pressure in chamber 133 has the same effect on the gas generator control as increasing the pressure in chamber 137 to the left of the diaphragm, which is the result of the closing of valve 78 by underspeed of the power turbine.

The inertia of the rotor prevents any radical overspeed by the power turbine at this point and, in fact, there will normally be some decrease in speed of the power turbine because of the time lag for acceleration of the gas generator. As a result there will be an underspeed signal in line 79 from the power turbine governor. Once this underspeed signal is effective there is no longer any need for the anticipating signal from the anticipator A. Therefore, this underspeed signal, by increase in pressure in line 79, compresses bellows 119 and rod 118 overrides spring 107, allowing the valve member 124 to return to normal position, putting reference pressure in chamber 133.

It may be pointed out that the existence of a droop in power turbine speed is most likely but that the extent and duration of the droop is greatly reduced by the anticipating action of our control which increases gas generator fuel before the beginning of underspeed of the power turbine.

When the bellows 119 restores valve 124 to normal position, it also closes valve 112, again making the power signal from the torquemeter effective to hold valve 112 closed. Thus, as long as the engine is delivering a substantial part of its rated power output, the anticipator remains disabled regardless of the collective pitch setting.

The detailed description of the preferred embodiment of the invention for the purpose of explaining the principles thereof is not to be considered as limiting or restricting the invention, as many modifications may be made by the exercise of skill in the art.

We claim:
1. A control system for a gas turbine engine connected to and driving a variable load comprising, in combination,
   operator-controllable means for varying engine power output
   means for controlling engine fuel actuated by the said means
   operator-controllable means for varying the power demand of the load
   means transmitting a signal indicative of engine power output to the load
   a settable governing means responsive to engine speed effective to regulate engine fuel
   the governing means including means establishing a reference signal and
   means responsive to engine speed effective to derive a governing signal from the reference signal and to decrease the governing signal relative to the reference signal upon overspeed and further including
   differential responsive means normally responsive to the reference and governing signals effective to vary engine fuel in the direction to reduce fuel upon overspeed, and
   anticipator means operative to accelerate engine response to an increase in load including
   means shiftable from a normal condition to an operated condition to disconnect the reference signal from the differential responsive means and connect instead a signal lower than the reference signal
   means responsive to the power demand varying means coupled to the shiftable means, and
   means responsive to the engine power output signal coupled to the shiftable means
   the two last-mentioned means being so connected that the shiftable means remains in normal condition above a predetermined power output level and also below a predetermined power demand level and is operated in response to higher power demand concurrent with lower power output.

2. A control system as recited in claim 1 in which the variable load is a lifting rotor and the means for varying the power demand of the load adjusts the collective pitch of the rotor.

3. A control system for a gas turbine engine connected to and driving a variable load comprising, in combination,
   operator-controllable means for varying engine power output
   means for controlling engine fuel actuated by the said means
   operator-controllable means for varying the power demand of the load
   means transmitting a signal indicative of engine power output to the load
   a settable governing means responsive to engine speed effective to regulate engine fuel
   the governing means including means establishing a reference pressure and
   means responsive to engine speed effective to derive a governing pressure from the reference pressure and to reduce the governing pressure relative to the reference pressure upon overspeed and further including
   differential pressure responsive means normally responsive to the reference and governing pressures effective to vary engine fuel in the direction to reduce fuel upon overspeed, and
   anticipator means operative to accelerate engine response to an increase in load including
   valve means shiftable from a normal condition to an operated condition to disconnect reference pressure from the pressure responsive means and connect instead a source of pressure lower than the reference pressure
   means responsive to the power demand varying means coupled to the valve means, and means responsive to the engine power output signal coupled to the valve means the two last-mentioned means being so connected that the valve means remains in normal condition above a predetermined power output level and also below a predetermined power demand level and is operated in response to higher power demand concurrent with low power output.

4. A control system for a gas turbine engine connected to and driving a variable load comprising, in combination, operator-controllable means for varying engine power output means for controlling engine fuel actuated by the said means operator-controllable means for varying the power demand of the load means transmitting a signal indicative of engine power output to the load a settable governing means responsive to engine speed effective to regulate engine fuel the governing means including means establishing a reference pressure and means responsive to engine speed effective to derive a governing pressure from the reference pressure and to reduce the governing pressure relative to the reference pressure upon overspeed and further including differential pressure responsive means normally responsive to the reference and governing pressures effective to vary engine fuel in the direction to reduce fuel upon overspeed, and anticipator means operative to accelerate engine response to an increase in load including valve means shiftable from a normal condition to an operated condition to disconnect reference pressure from the pressure responsive means and connect instead a source of pressure lower than the reference pressure means responsive to the power demand varying means effective to bias the valve means increasingly toward operated condition with increase in power demand, and means responsive to the engine power output signal effective to bias the valve means increasingly toward normal condition with increase in power output.

5. A control system for a gas turbine engine connected to and driving a variable load comprising, in combination, operator-controllable means for varying engine power output means for controlling engine fuel actuated by the said means operator-controllable means for varying the power demand of the load means transmitting a signal indicative of engine power output to the load a settable governing means responsive to engine speed effective to regulate engine fuel the governing means including means establishing a reference pressure and means responsive to engine speed effective to derive a governing pressure from the reference pressure and to reduce the governing pressure relative to the reference pressure upon overspeed and further including differential pressure responsive means normally responsive to the reference and governing pressures effective to vary engine fuel in the direction to reduce fuel upon overspeed, and anticipator means operative to accelerate engine response to an increase in load including valve means shiftable from a normal condition to an operated condition to disconnect reference pressure from the pressure responsive means and connect instead a source of pressure lower than the reference pressure means responsive to the power demand varying means effective to bias the valve means increasingly toward operated condition with increase in power demand, and means responsive to the engine power output signal effective to bias the valve means increasingly toward normal condition with increase in power output the two last-mentioned means being so constructed that the valve means remains in normal condition above a predetermined power output level and also below a predetermined power demand level and is operated in response to higher power demand concurrent with low power output.

6. A control system for a gas turbine engine connected to and driving a variable load comprising, in combination, operator-controllable means for varying engine power output means for controlling engine fuel actuated by the said means operator-controllable means for varying the power demand of the load means transmitting a signal indicative of engine power output to the load a settable governing means responsive to engine speed effective to regulate engine fuel the governing means including means establishing a reference pressure and means responsive to engine speed effective to derive a governing pressure from the reference pressure and to reduce the governing pressure relative to the reference pressure upon overspeed and further including differential pressure responsive means normally responsive to the reference and governing pressures effective to vary engine fuel in the direction to reduce fuel upon overspeed, and anticipator means operative to accelerate engine response to an increase in load including valve means shiftable from a normal condition to an operated condition to disconnect reference pressure from the pressure responsive means and connect instead a source of pressure lower than the reference pressure means responsive to the power demand varying means effective to bias the valve means increasingly toward operated condition with increase in power demand means responsive to the engine power output signal effective to bias the valve means increasingly toward normal condition with increase in power output the two last-mentioned means being so constructed that the valve means remains in normal condition above a predetermined power output level and also below a predetermined power demand level and is operated in response to higher power demand concurrent with low power output, and means effective to disable the means responsive to the power output signal while the valve means is in its operated condition.

7. A control system for a gas turbine engine connected to and driving a variable load comprising, in combination, operator-controllable means for varying engine power output means for controlling engine fuel actuated by the said means operator-controllable means for varying the power demand of the load means transmitting a signal indicative of engine power output to the load a settable governing means responsive to engine speed effective to regulate engine fuel the governing means including means establishing a reference pressure and means responsive to engine speed effective to derive a governing pressure from the reference pressure and to reduce the governing pressure relative to the reference pressure upon overspeed and further including differential pressure responsive means normally responsive to the reference and governing pressures effective to vary engine fuel in the direction to reduce fuel upon overspeed, and anticipator means operative to accelerate engine response to an increase in load including valve means shiftable from a normal condition to an operated condition to disconnect reference pressure from the pressure responsive means and connect instead a source of pressure lower than the reference pressure means responsive to the power demand varying means effective to bias the valve means increasingly toward operated condition with increase in power demand means responsive to the engine power output signal effective to bias the valve means increasingly toward normal condition with increase in power output the two last-mentioned means being so constructed that the valve means remains in normal condition above a predetermined power output level and also below a predetermined power demand level and is operated in response to high power demand concurrent with low power output means responsive to the governing pressure effective to bias the valve means toward normal condition in response to increase in the governing pressure, and means effective to disable the means responsive to the power output signal while the valve means is in its operated condition.

No references cited.

JULIUS E. WEST, *Primary Examiner.*